(12) United States Patent
Liu et al.

(10) Patent No.: US 8,868,658 B2
(45) Date of Patent: Oct. 21, 2014

(54) CLIENT ASSISTED MULTICASTING FOR AUDIO AND VIDEO STREAMS

(75) Inventors: Yanghua Liu, Santa Clara, CA (US); Bin Hu, Hangzhou (CN); Erzhen Liang, Ningbo (CN)

(73) Assignee: Cisco Technology, Inc., San Jose, CA (US)

( * ) Notice: Subject to any disclaimer, the term of this patent is extended or adjusted under 35 U.S.C. 154(b) by 100 days.

(21) Appl. No.: 13/459,002

(22) Filed: Apr. 27, 2012

(65) Prior Publication Data

US 2013/0290418 A1   Oct. 31, 2013

(51) Int. Cl.
*G06F 15/16* (2006.01)

(52) U.S. Cl.
USPC ............................. 709/205; 709/229; 709/231

(58) Field of Classification Search
USPC ......... 709/204, 205, 206, 223, 224, 226, 227, 709/229
See application file for complete search history.

(56) References Cited

U.S. PATENT DOCUMENTS

| | | | |
|---|---|---|---|
| 7,061,880 B2 * | 6/2006 | Basilier | 370/312 |
| 7,610,485 B1 | 10/2009 | Yadav | |
| 7,623,474 B2 | 11/2009 | Tran et al. | |
| 7,778,273 B2 * | 8/2010 | Luo et al. | 370/465 |
| 8,130,643 B2 | 3/2012 | Dattagupta et al. | |
| 8,144,628 B2 | 3/2012 | Previdi et al. | |
| 8,179,891 B2 * | 5/2012 | Rachwalski et al. | 370/390 |
| 8,621,083 B2 * | 12/2013 | Bowers et al. | 709/227 |
| 2008/0020801 A1 * | 1/2008 | Fesas et al. | 455/561 |
| 2010/0278336 A1 * | 11/2010 | Tahan et al. | 380/46 |
| 2012/0036262 A1 * | 2/2012 | Murphy et al. | 709/225 |

\* cited by examiner

*Primary Examiner* — Viet Vu
(74) *Attorney, Agent, or Firm* — Edell, Shapiro & Finnan, LLC

(57) ABSTRACT

A method, a system and computer readable storage media facilitate receiving a data stream from a host media server that is outside of a network, designating a multicasting source within the network to receive the data stream from the host media server, and multicasting the data stream from the multicasting source to a plurality of client devices within the network.

18 Claims, 5 Drawing Sheets

CLIENT ASSISTED MULTICASTING FOR AUDIO AND VIDEO STREAMS

TECHNICAL FIELD

The present disclosure relates to we based meetings in which a media server provides audio and/or video streams to multiple clients within an enterprise.

BACKGROUND

When hosting a large web conference meeting or other online communication session with many participants, particularly meetings involving video content, the data streams can utilize significant bandwidth for an enterprise such as a corporation or organization. Certain techniques are known for reducing bandwidth usage for transmission of data streams to multiple end points or nodes, such as peer-to-peer (P2P), cascading and multicasting. However, these techniques can present certain issues.

For example, when utilizing P2P and cascading techniques, network latency issues may be introduced due to the multiple level tree structure in which data streams are passed between nodes. This often renders P2P and cascading unsuitable for real time communications.

Multicasting by a host media server from the cloud (e.g., via the internet or a remote network) to a network for an enterprise during a web meeting can also present problems. This is due to the fact that, for security reasons, most enterprises typically prevent or block any multicast data stream coming from an outside source via the internet from passing through the firewall of the enterprise network.

DESCRIPTION OF EXAMPLE EMBODIMENTS

Overview

Figure 1:
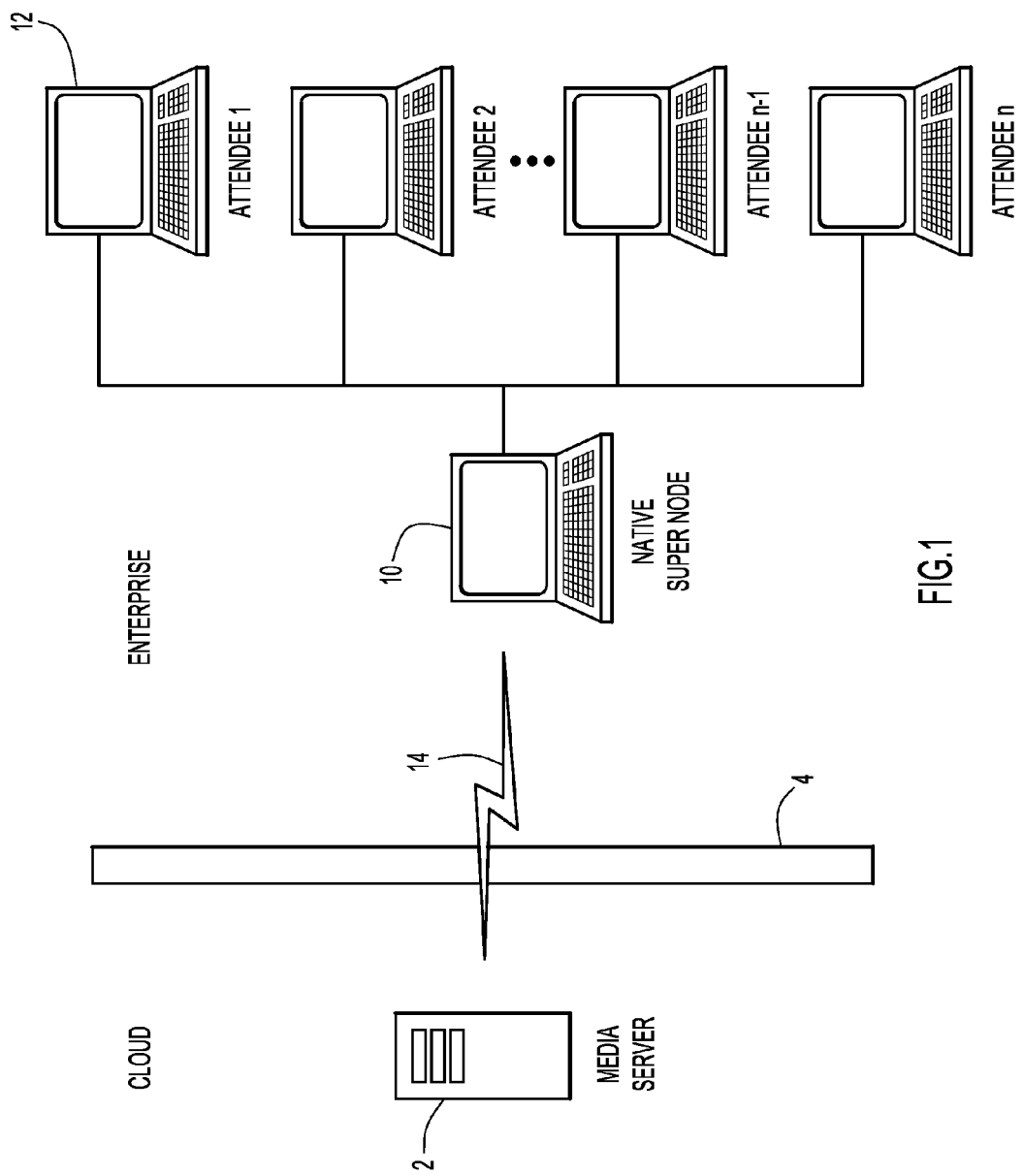
FIG. 1 is a schematic diagram of an example embodiment of a system architecture in which client devices within a network receive data streams from a host media server outside of the network, where the data streams are multicast within the network to the client devices by a designated multicast source.

A method, a system and computer readable storage media facilitate receiving a data stream from a host media server that is outside of a network, designating a multicasting source within the network to receive the data stream from the host media server, and multicasting the data stream from the multicasting source to a plurality of client devices within the network.

Example Embodiments

In a network for an enterprise such as a corporation, an organization, association, etc., that includes a plurality of client devices, a multicasting node is designated for receiving media data streams that can include audio and/or video content, particularly content associated with a collaboration session such as a web conference meeting or other online communication session between client devices or nodes within the enterprise network and/or client devices of other networks.

Multicasting refers to the delivery of a message or information, such as a data stream of audio, video and/or other content, to a group of destination computing devices (also referred to herein as nodes) substantially simultaneously in a single transmission from a source computing device (source node). The multicasting source node provides a source data stream to one or more routers (or other suitable network components), and the one or more routers generate copies of the source data stream for sending substantially simultaneously to other destination nodes. For example, the multicasting source node transmits a data stream to a router, where the data stream includes data packets with information regarding routing addresses for sending multiple copies of the data stream simultaneously to destination nodes associated with the routing addresses.

Multicasting can be used in Internet Protocol (IP) applications for streaming media content that includes audio and/or video content. However, a problem that typically occurs with multicasting from a host server to destination nodes within an enterprise network is that the firewall associated with the enterprise network prevents (for security reasons) multicasting of any information to nodes within the network. A firewall, as used herein, refers to is a component or device or set of devices configured to permit or deny transmissions of data streams or any other forms of content to computing devices within a defined network based upon a set of pre-defined rules (e.g., rules assigned by a network administrator). A firewall is typically utilized by an enterprise network (e.g., the computing network of a corporation or organization) to protect the computing devices within the network from unauthorized access and/or receiving non-essential or nuisance types of content (e.g., spam) while permitting legitimate content to pass through the firewall and into the network.

As described herein, a multicasting node is provided within an enterprise network (i.e., within the firewall of the network) that is configured to receive content from an external host server located in the cloud (i.e., at a location externally from the network, such as from a wide area network or some other region of the internet). The multicasting node within the network multicasts the content received from the external host server to other destination nodes within the network. In this manner, the multicasting occurs within the network so as to obviate issues associated with the external host server attempting to externally multicast multiple data streams of the same content to a plurality of destination nodes within the network. A system that utilizes a multicasting node within (i.e., inside the firewall of) the network will effectively facilitate web conferencing or other forms of online collaboration/communication sessions between multiple participants with substantial real-time transmission of content (e.g., audio and/or video content) to each participant without requiring high bandwidth capacity to achieve such dissemination of content.

The node within a network that serves as the multicasting node can be any computing device within the network that is enabled to send and/or receive content with other nodes within the network. The multicasting node can be a predetermined or designated node within the network that remains the multicasting node throughout all collaboration sessions with an external host server. Alternatively, the multicasting node can be determined based upon a predetermined order for any given collaboration session, where the multicasting node can further change during the course or at any given time period during a collaboration session (e.g., based upon changing events that occur during the collaboration session). Further, the multicasting function can be assigned to any selected number of nodes (e.g., two or more) within the network. Example embodiments depicting multicasting nodes within an enterprise network for multicasting media content received as a single data stream from an external host media server are described herein with reference to the schematic diagrams of FIGS. 1-3.

Referring to FIG. 1, a system for facilitating an online communication or collaboration session (e.g., a web meeting) is depicted. A host media server 2 located somewhere in the cloud provides media content, including audio and/or video content, in data streams to client devices for participants engaged in the collaboration session. While a single host media server 2 is depicted, it is noted that a suitable number of external host media servers can be utilized to provide content for a collaboration session to participants including participants with client devices located within the enterprise network. Some of the participants include a group of n attendees with associated computing devices 12 located within an enterprise network. The host media server 2 is located externally in relation to the enterprise network, such that any transmission of content by the server 2 to the n attendees associated with client devices 12 passes through the firewall 4 of the enterprise network.

In the embodiment of FIG. 1, a native super node 10 within the enterprise network is designated as the multicasting node for providing media streams to other nodes in the network. The super node 10 serves as a relay device and/or proxy server within the network for handling the flow of content between other nodes within the network (e.g., acting as an intermediary that facilitates exchange of content between two or more nodes). In addition to performing super node functions, the super node 10 can also be associated with a participant who engages in a collaboration session in relation to content 14 provided by the external media server 2. The super node 10 receives data streams of content 14 through the firewall 4 from the host media server 2 and multicasts the content in a substantially simultaneous manner to the destination nodes or the computing devices 12 of the attendees within the enterprise network.

In another example embodiment, the native super node 10 can be a source of some or all of the media content (e.g., this node could be the source for video content, where the user at this node is providing the video content at a given time period during a collaboration session). In this scenario, since the native super node 10 is the source of certain media content, this node does not need to receive its source content from the media server 2 but instead multicasts its source content to other attendee nodes within the network. The super node 10 may also send its source content to the media server 2 if there are other attendees that need to receive such content outside of the enterprise network (e.g., attendees of the collaboration session that are not a part of and thus not within the firewall of the enterprise network). If the source of media content changes within the network to another node (e.g., during an ongoing collaboration session), the next node that is the source for such content can then become the super node 10 for multicasting its source content to other attendee nodes within the enterprise network.

As previously noted, the simultaneous or substantially simultaneous transmission of the same content to multiple nodes can be achieved utilizing a router or any other suitable network device, where the super node 10 (or other multicasting node) transmits a data stream of the content to the router, including data packets which provide routing information for the various destination nodes that are to receive the content, and the router utilizes the routing information to transmit the same data stream to multiple destination nodes at the same or substantially the same time. Thus, each attendee of the collaboration session receives the same media streaming content 14 substantially simultaneously and in real time from the native super node 10 for viewing at each attendee computing device 12.

Figure 2:
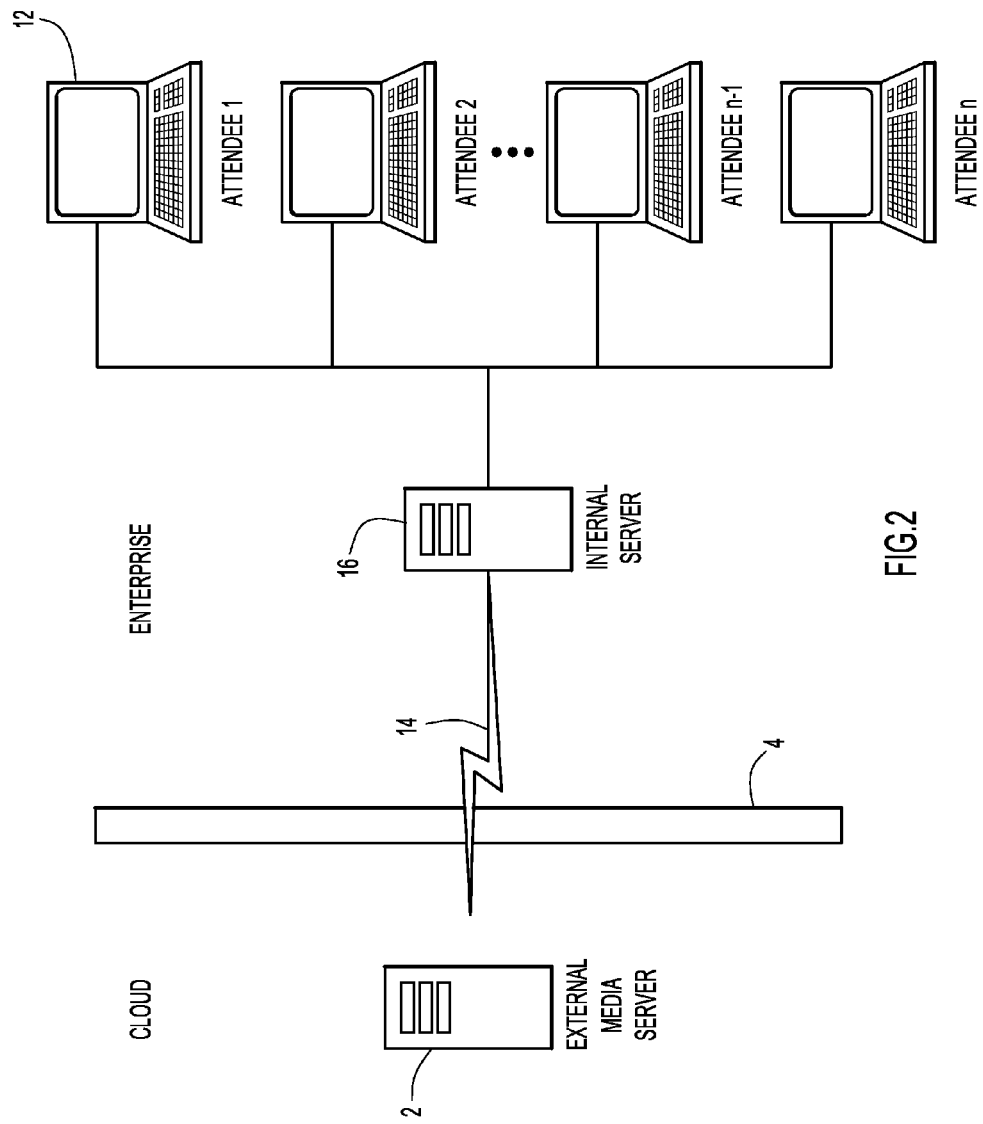
FIG. 2 is a schematic diagram of another example embodiment of a system architecture in which client devices within a network receive data streams from a host media server outside of the network, where the data streams are multicast within the network to the client devices by a designated multicast source.

An alternative example embodiment of a system incorporating a multicasting node within an enterprise network is depicted in FIG. 2, where elements having like reference numbers associated with elements in FIG. 2 are the same or substantially similar as those depicted in FIG. 1. In the system of FIG. 2, the multicasting node comprises a server 16 for the enterprise network. The server 16 can provide services for nodes within the network in relation to the collaboration session associated with content 14 provided by the external media server 2 and/or any other tasks in relation to operations within the enterprise network.

Figure 3:
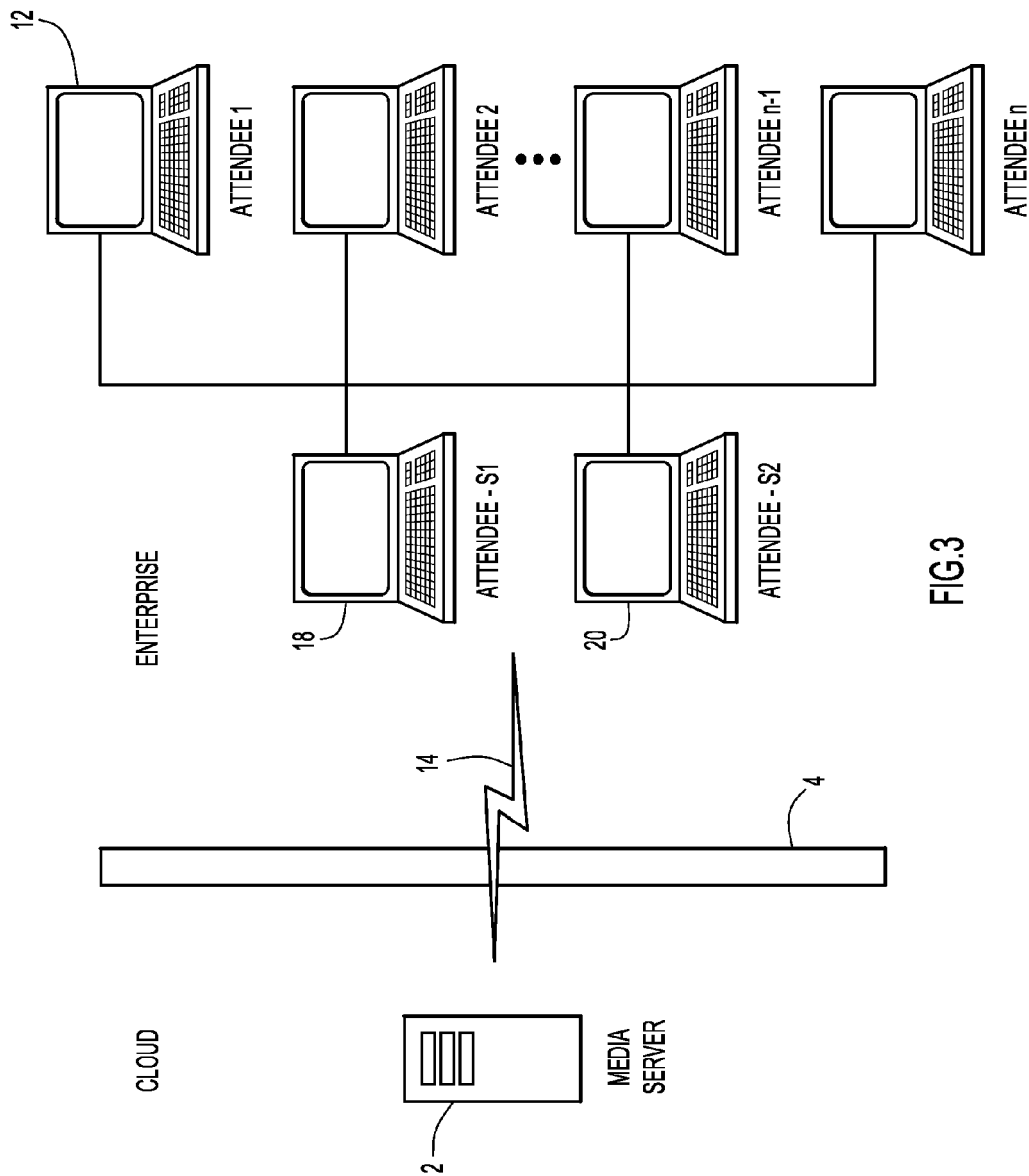
FIG. 3 is a schematic diagram of a further example embodiment of a system architecture in which client devices within a network receive data streams from a host media server outside of the network, where the data streams are multicast within the network to the client devices by a designated multicast source.

In a further example embodiment depicted in FIG. 3, one or more participant nodes facilitate multicasting to other nodes within the enterprise network during a collaboration session in which content 14 is transmitted to the network by the external media server 2. In this embodiment, one or more participants of the collaboration session can be designated as the multicasting node at the time of initiation of the collaboration session (e.g., participant nodes labeled Attendee-S1 and Attendee-S2 in FIG. 3). For example, one or more participants to first join the collaboration session can be designated as the multicasting node(s), where alternative multicasting nodes can also be designated (i.e., switching from a current multicasting node to another subsequent node designated as the multicaster) in the event a current multicasting node ceases to perform the multicasting function (e.g., a current multicasting node leaves, unregisters or disconnects from the collaboration session, or a problem occurs in which multicasting becomes unavailable from the current multicasting node).

Figure 4:
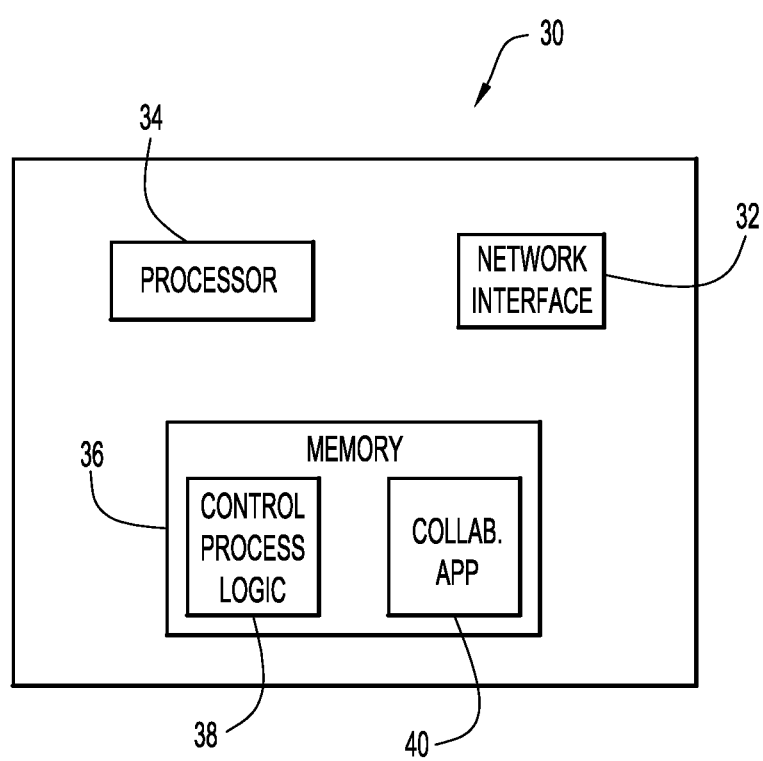
FIG. 4 is a schematic block diagram of an example computing device representing at least one node within a network, including nodes that are configured to facilitate multicasting to other nodes within the network of data streams transmitted from an external host media server in a system architecture as set forth in the example embodiments of FIGS. 1-3.

Each node comprises a computing device having a general configuration as depicted in the block diagram of FIG. 4. In particular, a computing device 30 includes a network interface unit 32, a processor 34 and a memory 36. The computing device 30 can also include any suitable input and/or output peripheral or other devices (e.g., a keyboard or keypad, an LCD or other suitable display, a mouse or touch pad, a microphone and/or camera/video recorder for audio/video input, a speaker unit or other audio output device, etc.) that facilitate input of data to and output of data from the computing device, where the input and output devices can be separate from or integrated with the computing device.

The network interface unit 32 comprises any suitable interface component (e.g., an Ethernet interface card or switch, a modem, etc.) that facilitates a wireless and/or hardwire connection over the network with other computing devices, including participant nodes, super nodes and/or any one or more servers of the network. It is further noted that the network interface unit 32 of the computing device 30 is configured for communication and exchange of data with one or more routers or other suitable components within the network that facilitate communication with other network nodes as well as facilitate multicasting functions that may be assigned to the computing device 32 (e.g., during a collaboration session in which content 14 is provided by one or more external media servers 2).

Figure 5:
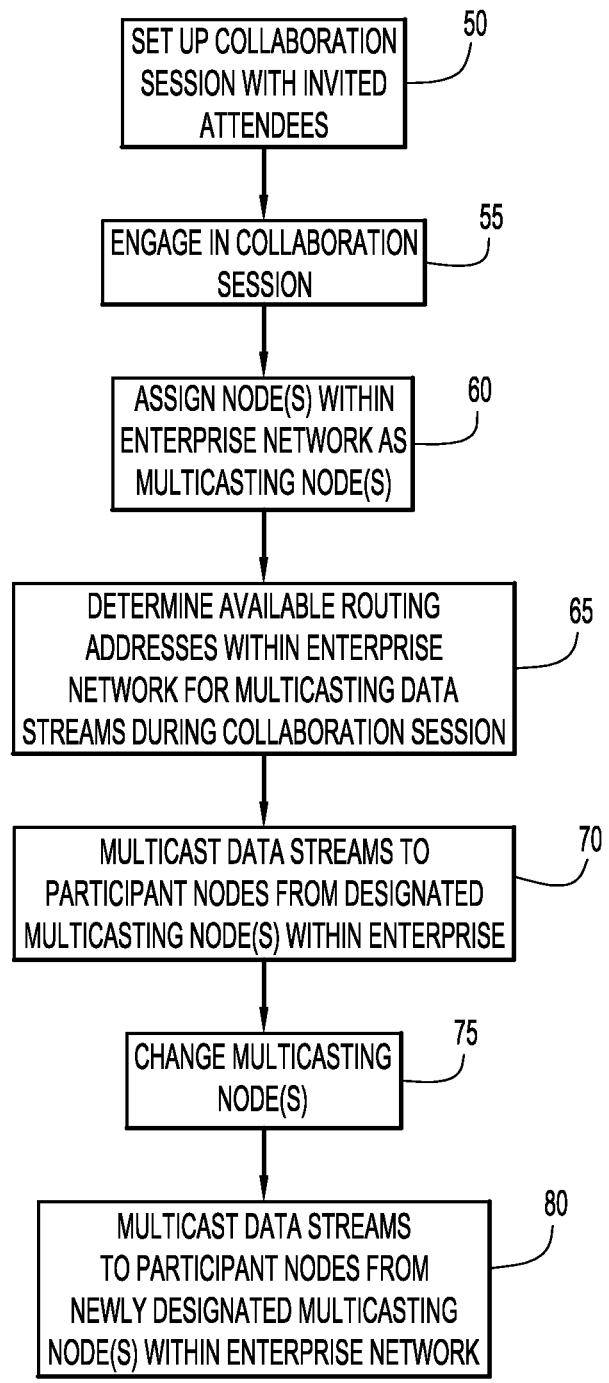
FIG. 5 is a flow chart depicting an example process for multicasting of media data streams within a network to client devices participating in a communication session utilizing the techniques described herein.

The processor 34 of the computing device 30 can comprise a microprocessor that executes control process logic instructions 38 stored within memory 36, where the control process logic instructions include operational instructions and software applications stored within memory 36, where the processor 34 performs operations including some or all of the steps as set forth in the flow chart of FIG. 5. For example, memory 36 can include a collaboration application module 40 that comprises a suite of one or more software applications to facilitate active participation of the computing device 30 in a collaboration session including receipt, processing and/or display of content 14 received from the external host media server 2. The software application(s) of module 40 further facilitate performance of some or all of the process steps by the computing device 30 as set forth in the flow chart of FIG. 5, where such process steps can be performed by a single computing device or shared by two or more computing devices. If the computing device 30 provides the function of a server or super node within the enterprise network, the software application(s) of the module 40 can further facilitate performance of other functions that support operation of the collaboration session (e.g., relaying of media content to other computing devices, hosting media content within the enterprise network that is accessible to other computing devices of the network, etc.).

The memory 36 can comprise read only memory (ROM), random access memory (RAM), magnetic disk storage media devices, optical storage media devices, flash memory devices, electrical, optical, or other physical/tangible (i.e., non-transitory) memory storage devices, and any combinations thereof.

Thus, each node includes a computing device 30 that is configured to engage in collaboration sessions with other participant nodes within the enterprise network as well as participants outside of the enterprise network. The collaboration sessions can include many different types of electronic communications, such as instant messaging communications, email communications, audio and/or video communications including phone calls, web conferencing, etc. Some examples of computing devices that can serve as nodes within the enterprise network include, without limitation, stationary (e.g., desktop) computers, personal mobile computer devices such as laptops, note pads, tablets, personal data assistant (PDA) devices, and other portable media player devices, and cell phones (e.g., smartphones) including suitable input and output devices as described above. The computing devices can also utilize any suitable operating systems (e.g., Android, Windows, Mac OS, Symbian OS, RIM Blackberry OS, Linux, etc.) to facilitate operation, use and interaction with other computing devices within or external from the enterprise network, including the external host media server 2 providing content 14 to the network.

Operation of the system depicted in FIG. 3 is now described with reference to the flow chart of FIG. 5, in which one or more participants are designated as multicasting nodes at the initiation of and/or during an ongoing collaboration session that includes transmission of content 14 from the external host media server 2. The process steps associated with the flow chart of FIG. 5 can be performed by a single computing device or two or more computing devices. At 50, a collaboration session (e.g., a web meeting that includes both audio and video content data streams) is set up, including the sending of invitations to each participant requested to attend the collaboration session as well as information regarding log-in and/or any other access information needed to attend the session. This can be performed by any potential participant of the session, including a participant located at a node within the enterprise network (e.g., an employee of a corporation) or located external to the enterprise network (e.g., a participant from another company or organization).

At 55, invited attendee nodes engage in the collaboration session by connecting with the host media server 2 and logging into or registering for the collaboration session (e.g., participant nodes including nodes 12, 18, 20 from the enterprise network as depicted in FIG. 3). The start of the collaboration session can begin based upon any predetermined event (e.g., a sufficient number of invited participants have logged into or registered for the collaboration session, the initiator of the collaboration session has logged in or registered, etc.).

At 60, a participant node within the enterprise network is assigned the role of multicasting node for the collaboration session (e.g., node 18 of FIG. 3). In an example embodiment, the multicasting node role is assigned to the first participant node within the enterprise network to join the collaboration session. Alternatively, as previously noted, two or more participants (e.g., the first participants to join/login/register for the collaboration session) may also be assigned the role of multicasting nodes (e.g., nodes 18 and 20 of FIG. 3). Further still, one or more multicasting nodes within the enterprise network can be assigned based upon any other criteria (e.g., selection of a participant node as a multicasting node based upon the specifications, design and/or processing capabilities of the computing device at the participant node).

At 65, an assigned multicasting node within the enterprise network determines a range of routing addresses that are currently available for use in multicasting data streams to various nodes within the network for the collaboration session. For example, an administrator or other facilitator of the enterprise network may assign a group or range of routing addresses to be used for multicasting purposes within the network, and the assigned multicasting node for a collaboration session determines which routing addresses are currently available (e.g., not already being used) at the start of the collaboration session. The available routing addresses are assigned to destination nodes associated with potential participants within the enterprise network. The number of routing addresses to be used for a collaboration session can be established based upon the number of scheduled participants of the collaboration session that are located at nodes within the enterprise network as well as the availability of particular addresses (e.g., in the event multiple collaboration sessions are scheduled within an enterprise network that have overlapping schedule times).

The utilization of a plurality of multicasting nodes within the enterprise network at the same or substantially similar time during an ongoing collaboration session can facilitate the provision of redundant data streams for use by participant/destination nodes within the enterprise network. For example, participant/destination nodes 12 may be configured to obtain multicast data streams of content 14 from multicasting node 18 and also multicasting node 20 substantially simultaneously, where node 18 is a primary node in which content is processed by the collaboration application modules 40 of the computing devices 30 associated with the destination nodes 12. In this scenario, node 20 is a secondary node that can be used to compensate for any packet loss from the data streams provided by node 18, where node 20 accounts for such packet loss so that each destination node 12 can process the content 14 without little or no latency issues. Alternatively, multicasting nodes 18 and 20 can be configured to multicast to different groups of participant/destination nodes at the same or substantially similar time within the enterprise network (e.g., where each multicasting node multicasts to a group of n/2 nodes 12, thus dividing the participants in the enterprise network in half for multicasting between each of the two nodes 18, 20). During the multicasting node assignment at 60, further participant nodes may also be assigned a back-up multicasting role to ensure that multicasting of data streams continues during the collaboration session in the event one or more of the currently assigned multicasting nodes actively discontinues or is unable to continue multicasting. For example, a participant of a current multicasting node (e.g., node 18 or 20 as depicted in FIG. 3) may decide to log off or unregister from the ongoing collaboration session. Alternatively, the participant of the current multicasting node may become incapable of continuing to multicast (e.g., due to an issue with the computing device 30 at the multicasting node). In the event this happens, the multicasting function is switched to one or more alternative participant nodes 12 in the enterprise network. An initial list or ordering of participant nodes can be established at the initialization of the collaboration session (e.g., based upon temporal order in which participant nodes logged in or registered for the collaboration session, the availability and/or capability of participant nodes to perform the function of a multicasting node, etc.), where switching from one multicasting node to another is based upon the order set in the list.

The ordered list of participant nodes to be designated candidate multicasting nodes can change throughout the collaboration session due to certain participants no longer being available as candidates for serving as multicasting nodes (e.g., participant nodes leave or unregister from the collaboration session). In addition, in the event that content for a collaboration session is originating within the enterprise network (e.g., a participant at a node 12 within the network is providing audio and/or video content for the session), the participant node within the network from which the content originates can be designated as a multicasting node. This ensures that no latency issues occur with content being provided to participants of the collaboration session within the enterprise network. Further, if the origin or source of content changes from one participant node to another within the enterprise network during an ongoing collaboration session, designation of the multicasting function within the enterprise network can be switched such that the participant node from which the content originates is always assigned the role of multicasting content to other participant nodes within the network.

At 70, the current designated multicasting node or nodes (e.g., nodes 18 and 20 as depicted in FIG. 3) multicast data streams including content 14 provided by the external host media server 2. For example, the host media server 2 can provide a single data stream of content 14 to an external routing address of the enterprise network, and this data stream is routed within the enterprise network to the currently designated multicasting node(s). The currently designated multicasting node(s) multicast the content 14 to the group of participant destination nodes (e.g., nodes 12 depicted in FIG. 3) based upon the previously established multicasting addresses assigned to destination nodes for participants of the collaboration session.

At 75, a change is made to one or more designated multicasting nodes within the enterprise network. The reasons for making a switch from a current multicasting node to another multicasting node (e.g., based upon the predetermined ordered list, established during the multicasting node assignment at 60) has been previously noted. A change from a current multicasting node to another participant node within the enterprise network can occur, e.g., by the current multicasting node first unregistering from the collaboration session, where the unregistering occurs with a host server within the enterprise network that supports features of the collaboration session and/or with the external host media server 2. Instructions can be provided with the unregistering of the current multicasting node to switch the data stream feed of content 14 (which is provided from the external host media server 2 to an external routing address of the enterprise network) to the routing address (or routing addresses) associated with the predetermined next available participant node(s), and the next available participant node(s) then become the new multicasting node(s) for the collaboration session. In another example embodiment, in which content for the collaboration session is originating from a participant node within the enterprise network, a change from one multicasting node to another participant node can occur when there is a change in content source between participant nodes in the network. At 80, the multicasting of content 14 (e.g., content provided by the host media server 2 or content that originates from a participant node within the enterprise network) is provided by the new multicasting node(s) to the remaining participant nodes 12 within the enterprise network. Further changes to current multicasting nodes can occur as necessary, with multicasting to nodes of content 14 continuing until the collaboration session has ended.

Thus, providing multicasting internally within an enterprise network allows for the enterprise (e.g., corporation, organization, association, etc.) to host a large collaboration event within the network while minimizing bandwidth issues within the network as well as minimizing the number of internet connections needed at a given time (since only one data stream feed from an external host media server need be provided into the network while multicasting occurs within the network). In addition, better overall audio and/or video quality may be obtained by utilizing multiple multicasting nodes at the same time (e.g., providing redundant content allows for replacing corrupt data packets from one data stream or switching entirely to processing the feed from another data stream when necessary to ensure quality of the content). Multicasting within the enterprise network further provides less latency issues and also is not burdened by capacity limitations in comparison to using alternative schemes such as P2P and cascading.

Further, in the event multicasting is failing entirely or is providing poor performance in a collaboration session, the nodes and/or supporting servers of the enterprise network can switch from multicasting of the data streams to each participating node/client switching back to obtaining the data stream of the collaboration session directly from a data center (e.g., by switching to a direct client/server relationship with the external host media server). A detection feature can be provided within the enterprise network that determines whether multicasting performance is acceptable (e.g., based upon a threshold level of quality of multicast data streams). If it is deemed unacceptable from one or more current multicasting nodes, a switch can first be made to one or more other candidate multicasting nodes. However, if the multicasting performance does not improve after switching to one or more other candidate multicasting nodes, a switch can then be made to obtaining data streams directly from the data center from which the data streams originate (e.g., the host media server).

The multicast data streams provided within the enterprise network can also be encrypted (e.g., at the multicasting node(s)) using, e.g., the Advanced Encryption Standard (AES). The other participant nodes within the network, having been provided the suitable decryption key(s), can easily decrypt the content for use at their computing devices. This provides a further security feature that prevents uninvited users from easily accessing the content of the collaboration session from the enterprise network.

Control of data flow from multicasting within the enterprise network can also be easily controlled by the multicasting node (or other computing device(s) associated with the collaboration session) setting a suitable Time-To-Live (TTL) value on the packets of the data streams, where data packets that exceed a threshold life span (based upon a counter or timestamp applied to the data packets) are discarded to prevent further circulation of such data packets within the network.

While the techniques have been described herein with respect to a system, it should be understood that they may be embodied in an apparatus comprising a network interface device configured to enable communications in a network including receiving of data streams from computing devices within the network as well as data streams from a host media server external to the network; and a processor coupled to the network interface device, and configured to designate a multicasting source comprising one of the computing devices within the network to receive a data stream from the host media server; and multicast the data stream from the multicasting source to a plurality of other computing devices within the network.

The above description is intended by way of example only.

What is claimed is:

1. A method comprising:
   receiving a data stream from a host media server that is outside of a network;
   designating a plurality of multicasting sources within the network to receive the data stream from the host media server and multicast the data stream to client devices within the network; and
   multicasting the data stream by each of the plurality of multicasting sources from the host media server to a same group of client devices within the network so as to facilitate redundant transmission of content to the client devices within the same group;
   wherein the data stream from the host media server comprises data associated with a collaboration session arranged between a plurality of client devices including client devices within the network, and designating further comprises:
   designating at least one multicasting source as a client device within the network from which content originates in relation to the collaboration session.

2. The method of claim 1, wherein multicasting further comprises:
   multicasting the data stream by each of the plurality of multicasting sources from the host media server to a different group of client devices within the network.

3. The method of claim 1, further comprising:
   determining, via at least one multicasting source, a range of routing addresses to be used within the network for multicasting the data stream to client devices within the network.

4. The method of claim 1, wherein designating further comprises:
   designating an initial multicasting source as a first client device within the network to join the collaboration session.

5. The method of claim 4, further comprising:
   switching from a first designated multicasting source to a second designated multicasting source within the network during the collaboration session.

6. The method of claim 5, wherein switching further comprises:
   switching from the first designated multicasting source to the second designated multicasting source in response to the first designated multicasting source leaving the collaboration session.

7. The method of claim 5, wherein switching further comprises:
   switching from the first designated multicasting source to the second designated multicasting source in response to a change in originating content in relation to the collaboration session changing from the first designated multicasting source to the second designated multicasting source.

8. A system comprising:
   a plurality of computing devices within a network, each computing device comprising a network interface unit configured to receive data streams from other computing devices within the network as well as data streams from a host media server external to the network, a memory configured to store instructions, and a processor;
   wherein the processor of at least one of the network computing devices is configured to:
   designate a plurality of multicasting sources within the network to receive a data stream from the host media server; and
   multicast the data stream from the multicasting sources to a plurality of other computing devices within the network, wherein at least two of the plurality of computing devices within the network are each designated as a multicasting source to receive the data stream from the host media server and multicast the data stream to computing devices within the network; and
   wherein the data stream from the host media server comprises data associated with a collaboration session arranged between a plurality of client devices including computing devices within the network, and the processor is further configured to designate at least one multicasting source as a computing device within the network from which content originates in relation to the collaboration session.

9. The system of claim 8, wherein a processor of a computing device designated as a multicasting source is further configured to determine a range of routing addresses to be used within the network for multicasting the data stream to computing devices within the network.

10. The system of claim 8, wherein an initial designated multicasting source comprises a first computing device within the network to join the collaboration session.

11. The system of claim 10, wherein the processor of at least one of the network computing devices is further configured to switch from a first designated multicasting source to a second designated multicasting source within the network during the collaboration session.

12. The system of claim 11, wherein the processor that is configured to switch is responsive to the first designated multicasting source leaving the collaboration session.

13. One or more computer readable storage media encoded with software comprising computer executable instructions and when the software is executed operable to:
- receive a data stream from a host media server that is outside of a network;
- designate a plurality of multicasting sources within the network to receive the data stream from the host media server and to multicast the data stream to client devices within the network; and
- multicast the data stream from the host media sever by each of the plurality of multicasting sources to a same group of client devices within the network so as to facilitate redundant transmission of content to the client devices of the same group;
- wherein the data stream from the host media server comprises data associated with a collaboration session arranged between a plurality of client devices including client devices within the network, and designating further comprises:
- designating at least one multicasting source as a client device within the network from which content originates in relation to the collaboration session.

14. The computer readable storage media of claim 13, wherein the instructions that are operable to multicast comprise instructions operable to multicast the data stream from the host media server by each of the plurality of multicasting sources to a different group of client devices within the network.

15. The computer readable storage media of claim 13, further comprising instructions that are operable to:
- determine, via at least one multicasting source, a range of routing addresses to be used within the network for multicasting the data stream to client devices within the network.

16. The computer readable storage media of claim 13, further comprising instructions operable to initially designate a multicasting source as a first client device within the network that joins the collaboration session.

17. The computer readable storage media of claim 16, further comprising instructions that are operable to:
- switch from a first designated multicasting source to a second designated multicasting source within the network during the collaboration session.

18. The computer readable storage media of claim 17, wherein the instructions operable to switch comprise instructions operable to switch from the first designated multicasting source to the second designated multicasting source in response to the first designated multicasting source leaving the collaboration session.

* * * * *